United States Patent [19]

Lailach et al.

[11] Patent Number: 5,271,919
[45] Date of Patent: Dec. 21, 1993

[54] PROCESS FOR THE THERMAL DECOMPOSITION OF METAL SULPHATES

[75] Inventors: Günter Lailach; Rudolf Gerken, both of Krefeld, Fed. Rep. of Germany

[73] Assignee: Bayer Aktiengesellschaft, Leverkusen, Fed. Rep. of Germany

[21] Appl. No.: 730,031

[22] Filed: Jul. 12, 1991

Related U.S. Application Data

[63] Continuation of Ser. No. 463,070, Jan. 10, 1990, abandoned.

[30] Foreign Application Priority Data

Jan. 19, 1989 [DE] Fed. Rep. of Germany ....... 3901459

[51] Int. Cl.$^5$ .................. C01B 17/50; C01B 17/52
[52] U.S. Cl. ..................... 423/541; 423/542
[58] Field of Search ............. 423/541 R, 542, 540

[56] References Cited

U.S. PATENT DOCUMENTS

| | | | |
|---|---|---|---|
| 2,202,414 | 5/1940 | Barnes et al. | 23/177 |
| 3,195,981 | 7/1965 | Hansford et al. | 423/541 R |
| 4,102,989 | 7/1978 | Wheelock | 423/541 R |
| 4,194,889 | 3/1989 | Wanner | 423/542 |
| 4,744,969 | 5/1988 | Marten et al. | 423/542 |
| 4,824,655 | 4/1989 | Lailach et al. | 423/541 R |
| 4,853,206 | 8/1989 | Watson | 423/540 |

FOREIGN PATENT DOCUMENTS 1173074  1/1961  Fed. Rep. of Germany.

OTHER PUBLICATIONS

Ullmanns Encyclopaedie Der Technischen Chemie, vol. 18, 4. Auflage, 1978, pp. 579, 580, Weinheim, DE *p. 579, rechte Spalte, Zeile 58–p. 580, linke Spalte, Zeile 6*.

*Primary Examiner*—Gary P. Straub
*Assistant Examiner*—Stephen G. Kalinchak
*Attorney, Agent, or Firm*—Sprung Horn Kramer & Woods

[57] ABSTRACT

A process for the thermal decomposition of metal sulphate mixtures at temperatures from 800° to 1100° C. under oxidizing conditions, in which the metal sulphate mixtures are mixed with roasting residue and reacted together with fuels in the decomposition reactor to form roasting residue and $SO_2$-containing gases from roasting wherein the roasting residue admixed with the sulphate mixture is the finely divided fraction of the resulting roasting residue which is separated from the stream of gas in an electrostatic gas purification apparatus and returned to the decomposition reactor.

This procedure has an advantageous influence on the formation of coarse roasting residue and also significantly reduces the proportion of undecomposed, water soluble sulphates in the roasting residue.

4 Claims, No Drawings

PROCESS FOR THE THERMAL DECOMPOSITION OF METAL SULPHATES

This application is a continuation of application Ser. No. 463,070, filed Jan. 10, 1990, now abandoned.

This invention relates to a process for the thermal decomposition of metal sulphate mixtures at temperatures from 800° to 1100° C. under oxidizing conditions, in which the metal sulphate mixtures are mixed with the finely divided fraction of the roasting residue and reacted with fuels in the decomposition reactor to form roasting residue and roaster gases containing $SO_2$.

Metal sulphates, in particular metal sulphate mixtures containing sulphuric acid, are obtained as residues from various processes. There is no worthwhile use for these metal sulphate mixtures, especially those containing mainly iron sulphate which are leftover from the recovery of the sulphuric acid from (he was(e acid formed in the production of $TiO_2$ by (he sulphate process.

The only environmentally acceptable method hitherto available for disposing of these inevitable by-products is their thermal decomposition to $SO_2$, $O_2$ and metal oxides (hereinafter referred to as roasting residue) at temperatures from 800° to 1100° C. (Ullmanns Encyclopadie der technischen Chemie, 4th Edition, Volume 18, pages 579 to 580, Verlag Chemie, Weinheim, 1978) but the presence of magnesium sulphate has a deleterious effect because sufficiently rapid decomposition of this sulphate can only be achieved under reducing conditions within the temperature range employed industrially. The reducing conditions proposed in DE-A 1 173 074 are, however, virtually impossible to realize in fluidized bed reactors which are advantageously used for this process.

The metal sulphates are generally introduced into the fluidized bed reactor together with the fuels required for the highly endothermic decomposition reaction. Sufficient air or air/oxygen mixture is blown through a stationary fluidized bed of coarse roasting residue from below to ensure that the gases leaving the reactor at the top have a small oxygen content in the region of 0.5 to 2 volumes %. Under reducing conditions, these gases contain elementary sulphur, whereas at higher oxygen contents they contain significant quantities of $SO_3$; both these are undesirable. Under normal conditions, the gases contain almost the whole roasting residue as dust in addition to $SO_2$, $O_2$, $H_2O$, $N_2$ and in some cases $CO_2$.

The gases are normally cooled from 800°–1100° C. to 300°–350° C. in a waste heat boiler, a significant proportion of the roasting residue separating off under these conditions. The more finely divided components of roasting residue are removed from the stream of gas in an electrostatic gas purification apparatus (EGR=Elektrostatische Gasreinigungsanlage) before the stream of gas is wet cleaned.

It is an object of this invention to provide a process which does not have the disadvantages described above.

It has now been found that the decomposition reaction in the fluidized bed reactor is advantageously influenced by mixing the metal sulphates with finely divided roasting residue from the electrostatic gas purification apparatus. The process according to the invention promotes the formation of coarse roasting residue which is important for maintaining the stationary fluidized bed.

This invention therefore relates to a process for the thermal decomposition of metal sulphate mixtures at temperatures from 800° to 1100° C. under oxidizing conditions, in which the metal sulphate mixtures are mixed with roasting residue and reacted together with fuels in the decomposition reactor to form roasting residue and $SO_2$-containing gases from roasting, and the finely divided fraction of the resulting roasting residue is separated from the stream of gas in an electrostatic gas purification apparatus and returned to the decomposition reactor.

The invention not only has an advantageous influence on the formation of coarse roasting residue but also significantly reduces the proportion of undecomposed, water soluble sulphates in the roasting residue.

The proportion of water soluble metal sulphates in the roasting residue can be substantially reduced by means of the process according to the invention. In a preferred embodiment of the process according to the invention, the fuels and the finely divided roasting residue are mixed together before being fed into the decomposition reactor. It is particularly advantageous to employ this process if the metal sulphates are compacted, e.g. pelletized, together with the fuels and finely divided roasting residue before the thermal decomposition. The fuels used in the context of this invention may be not only coal, tar, molasses, etc. but also pyrites or sulphur.

In one particularly preferred embodiment, the metal sulphate mixtures contain sulphuric acid at a concentration of 5 to 96% by weight as moisture content.

The advantages of the process according to the invention are illustrated with the aid of examples which, however, should not be regarded as limiting the invention.

COMPARISON EXAMPLE

In the process of working up waste acid resulting from the production of $TiO_2$ by the sulphate process, a metal sulphate mixture containing sulphuric acid and having the following composition was separated (all percentages are percentages by weight):

| | |
|---|---|
| 26.7% $FeSO_4.H_2O$ | 6.8% $Al_2(SO_4)_3.H_2SO_4.8\ H_2O$ |
| 28.7% $Fe_2H_2(SO_4)_3.H_2O$ | 2.8% $Fe_2(SO_4)_3.H_2SO_4.8\ H_2O$ |
| 9.1% $MgSO_4.H_2O$ | 0.7% $VOSO_4$ |
| 1.8% $MnSO_4.H_2O$ | 0.6% $Cr_2(SO_4)_3$ |
| 7.3% $TiOSO_4$ | 0.5% $CaSO_4$ |
| | 0.1% $Na_2SO_4$ |
| | 9.7% $H_2SO_4$ |
| | 5.2% $H_2O$ |

The metal sulphate mixture, coal and roasting residue were mixed in ratios by weight of 1:0.3:0.1 and shaped into green pellets in accordance with DE-A 1 173 074. The roasting residue used consisted of part of the total roasting residue obtained from the thermal decomposition. The green pellets were fed into the fluidized bed reactor from a dosing bin and reacted at 980°±5° C.

The roasting residue removed from the plant when a steady state had been reached had the following composition:

| | |
|---|---|
| 39.8% Fe | 0.3% Cr |
| 1.5% Al | 0.6% Ca |
| 3.9% Mg | 0.1% Na |
| 5.1% Ti | 1.2% $SiO_2$ |
| 1.5% Mn | 8.8% $SO_4^{2-}$ |
| 0.5% V | 12.0% $H_2O$ |

EXAMPLE

A metal sulphate mixture (analogous to that of the Comparison Example) was mixed with coal and roasting residue in ratios by weight of 1:0 3:0.1 but instead of using a proportion of the total roasting residue, only the residue from the electrostatic gas purification apparatus was used. Subsequent working up and the decomposition reaction were carried out under the same conditions as in the Comparison Example.

The roasting residue which was withdrawn from the plant and not returned had the following composition:

| | |
|---|---|
| 41.1% Fe | 0.3% Cr |
| 1.6% Al | 0.6% Ca |
| 4.0% Mg | 0.1% Na |
| 5.3% Ti | 1.2% $SiO_2$ |
| 1.6% Mn | 4.8% $SO_4^{2-}$ |
| 0.5% V | 12.0% $H_2O$ |

We claim:

1. A process for the thermal decomposition of metal sulphate mixtures at temperatures from 800° to 1100° C. under oxidizing conditions, comprising (a) mixing the metal sulphate mixtures with roasting residue and reacting the mixture obtained together with fuels in a decomposition reactor to form $SO_2$-containing roaster gases which contain almost the whole roasting residue, (b) separating off a fraction of the roasting residue from said gases by cooling the gases from 800°–1100° C. to 300°–350° C. in a waste heat boiler, and then (c) separating off a fraction of the roasting residue from the resulting gas in an electrostatic gas purification apparatus, and then (d) returning only the fraction separated in the electrostatic gas purification apparatus to the decomposition reactor.

2. A process according to claim 1, comprising mixing together the metal sulphate mixture, the fuels and the finely divided roasting residue before feeding into the decomposition reactor.

3. A process according to claim 2, comprising compacting the mixture before its introduction into the decomposition reactor.

4. A process according to claim 1, wherein the metal sulphate mixtures contain sulphuric acid at a concentration of 5 to 96% by weight $H_2SO_4$ as moisture.

* * * * *